United States Patent
Bozzetto et al.

(10) Patent No.: US 6,330,437 B1
(45) Date of Patent: Dec. 11, 2001

(54) RADIO RANGE VERIFICATION METHOD, WIRELESS TELECOMMUNICATIONS EQUIPMENT IMPLEMENTING THIS METHOD, BASE STATION AND MOBILE HANDSET OF SUCH EQUIPMENT

(75) Inventors: Olivier Bozzetto; Jean-Pascal Bordeau, both of Le Mans (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/275,631

(22) Filed: Mar. 24, 1999

(30) Foreign Application Priority Data

Mar. 31, 1998 (FR) .................................................. 98 03985

(51) Int. Cl.$^7$ ........................................................ H04Q 7/20
(52) U.S. Cl. .......................... 455/421; 455/462; 455/422
(58) Field of Search ............................... 455/405, 420, 455/421, 423, 67.7, 513, 456, 461, 462, 465, 406, 411, 422; 370/315, 401

(56) References Cited

U.S. PATENT DOCUMENTS

| | | | |
|---|---|---|---|
| 5,193,216 | * | 3/1993 | Davis ................................. 455/67.7 |
| 5,388,149 | * | 2/1995 | Lynn et al. ........................... 455/562 |
| 5,426,690 | * | 6/1995 | Hikuma et al. ...................... 455/411 |
| 5,450,613 | * | 9/1995 | Takahara et al. ..................... 455/517 |
| 5,644,620 | * | 7/1997 | Shimura .............................. 455/421 |
| 5,787,354 | * | 7/1998 | Gray et al. .......................... 455/456 |
| 5,797,095 | * | 8/1998 | Gustafson et al. ................... 455/422 |
| 5,809,414 | * | 9/1998 | Coverdale et al. .................. 455/421 |
| 5,867,782 | * | 2/1999 | Yoon .................................. 455/421 |
| 5,898,679 | * | 4/1999 | Brederveld et al. ................. 370/315 |
| 5,915,224 | * | 6/1999 | Jonsson .............................. 455/552 |
| 5,978,669 | * | 11/1999 | Sanmugam .......................... 455/410 |

* cited by examiner

Primary Examiner—Tracy Legree
Assistant Examiner—Jean A Gelin
(74) Attorney, Agent, or Firm—Dicran Halajian

(57) ABSTRACT

A method of verifying effective radio range increases the distance over which wireless mobiles can be used around the base station. The level of the radio field received by the base station is measured to detect a range-limit electric signal. Instead of cutting off the communication at the detection of this signal, a presence verification protocol is initiated that includes exchanging presence confirmation after messages between the base station and the handset, and cutting off the communication only when one of the parts no longer receives a confirmation message after a predefined time period.

10 Claims, 2 Drawing Sheets

RADIO RANGE VERIFICATION METHOD, WIRELESS TELECOMMUNICATIONS EQUIPMENT IMPLEMENTING THIS METHOD, BASE STATION AND MOBILE HANDSET OF SUCH EQUIPMENT

FIELD OF THE INVENTION

The invention relates to a range limit verification method in a wireless telecommunications system including at least two parts that may communicate by radio channel inside a coverage area, the method including a reading step of reading an electric field level received by the second part and transmitted by the first part for detecting a range-limit electric signal.

The invention likewise relates to wireless telecommunications equipment including at least a first and a second part that can communicate by radio channel inside a coverage area, said equipment including detection means for detecting an electric field level received by the second part and transmitted by the first part for detecting a range-limit signal.

The invention finally relates to a base station and a handset suitable for such equipment.

The invention is notably applied to wireless telephones in accordance with a CT0 standard.

BACKGROUND OF THE INVENTION

The publication of the ICC Conference 1983, vol. 1, pp. 64–67, of which the conference entitled "Integrating Communication for World Progress" was held at Boston, Mass. from to Jun. 19 to 22, 1983, describes a method of predicting the radio range of telecommunications equipment based on the measurement of an indicator of electric field strength received locally while environment factors such as height and building density are taken into account. This method utilizes databases, which enable to determine the topography of the terrain between a base station and a mobile handset.

SUMMARY OF THE INVENTION

It is an object of the invention to provide simple means for avoiding that a radio communication between two parts of telecommunications equipment is cut off because of environmental conditions that disturb the local electric field received by one of the parts.

Therefore, a method as defined in the opening paragraph is provided, characterized in that the detection of said range-limit signal triggers a presence verification step of verifying the presence of said first part inside the coverage area, including a transmission of a radio message requesting a confirmation of presence to said first part.

According to an important characteristic feature of the method, said presence verification step includes:

a repetition step of:
sending said radio message requesting a confirmation of presence to said first part and
receiving a presence-confirmation message,
this step being repeated as long as the confirmation message is received by said second part in a given period of time, and a step of cutting off radio communications between said parts, triggered if said confirmation is not received in said period of time.

According to another important characteristic feature of the method, said repetition step is stopped when, during said reading step, a received electric field level is detected that exceeds a predetermined detection threshold.

Similarly, the invention provides equipment as defined in the opening paragraph, characterized in that it includes presence verification means for verifying the presence of the first part inside area, these means being triggered by the detection of said range-limit signal.

According to an important characteristic feature of the invention, said presence verification means are deactivated by the detection of a received electric field level that is higher than a predetermined threshold.

According to another characteristic feature of the invention, the presence verification means include:

transmitting means for sending a message requesting a confirmation of presence to said first part at given time intervals, delay means for triggering a delay that corresponds to said time intervals, receiving means for receiving said presence confirmation message, means for cutting off radio communications, triggered if said presence confirmation message is not received by said second part in a given period of time.

BRIEF DESCRIPTION OF THE DRAWINGS

These and other aspects of the invention are apparent from and will be elucidated, by way of non-limiting example, with reference to the embodiments described hereinafter.

In the drawings.

DESCRIPTION OF THE EMBODIMENTS

Although the functioning of the invention will be described in the direction from base station to mobile, the management is identical in the other direction.

Figure 1:
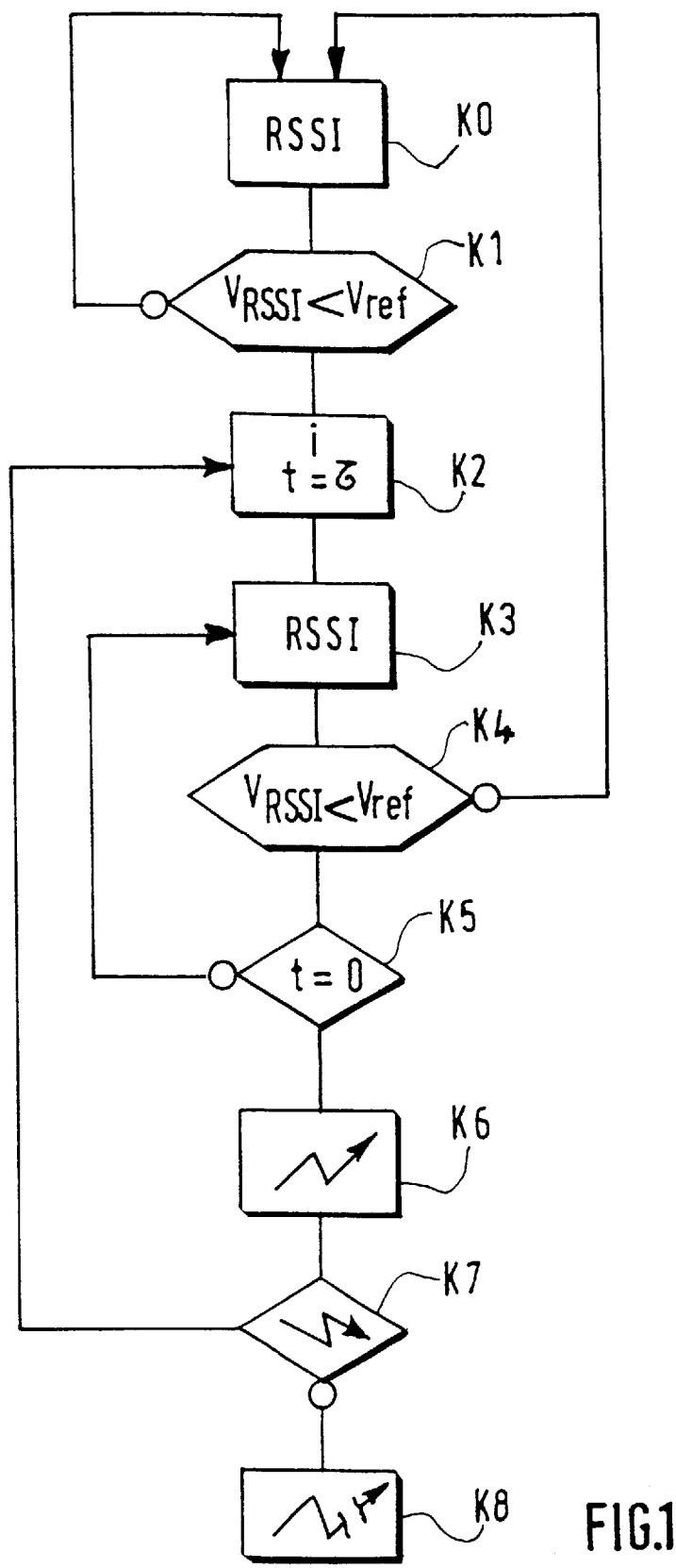
FIG. 1 represents a method according to the invention.

An example of a range-limit verification method is illustrated in FIG. 1 in the form of a flow chart whose boxes K0 to K8 represent the main steps. This method may advantageously be implemented in wireless telephony equipment formed by a mobile device called handset and a fixed device called base station connected to the switched network, for verifying the maximum distance of radio coverage between the two devices. This method may be implemented in the two devices in a perfectly symmetrical way. By way of example, its functioning will be described in the case where it is implemented in the base station.

In box K0, the method starts with a reading step of the electric field level emitted by the handset and received by the base station. This may be, for example, the reading of an indicator of the RSSI type (Received Signal Strength Indicator) used in most wireless telephones notably in accordance with the CT0 standard, to indicate the level of the received field strength.

Box K1 represents a test step for the detection of a range-limit signal, which consists of verifying the level of the RSSI field strength. This level is permanently tested to detect a range-limit signal ($V_{RSSI} < V_{ref}$) and trigger the verification step of the range limit. As long as the level of the RSSI field is higher than a predetermined detection threshold, that is to say, as long as the range-limit signal is not detected, the range-limit verification step is not triggered. Determining the range-limit detection threshold depends on requirements of radio quality imposed by the manufacturer or by the telephone standard under consideration. The detection of the range-limit signal ($V_{RSSI}<V_{ref}$) triggers the verification step of verifying the first presence in box K2.

A first repetition (i) of this step triggers a time delay (t=τ). The indicator RSSI continues to be read in box K3. If the level of the RSSI field again exceeds the detection threshold in box K4, the delay τ is stopped and the method is resumed at step K0 for verifying the level of the RSSI field.

On the other hand, if the level of the RSSI field remains below the detection threshold ($V_{RSSI}<V_{ref}$), step K5 is proceeded to test a value of the delay τ. If the delay expires (T=0), whereas the range-limit detection signal has been detected in step K1, and if the test of the step K4 is positive ($V_{RSSI}<V_{ref}$), in box K6 the base station emits a message to the mobile handset to request the confirmation of presence from the mobile handset.

If the handset is actually located in the radio coverage area of the base station, it receives this message and sends a confirmation message back to the base station. If this confirmation is received in box K7, in a defined time period corresponding to the time necessary for the transmission and reception of the radio frame of the order of 100 ms, the method repeats the steps K2 to K7 until the confirmation message waited for in step K7 is not received by the base station, which thus cuts off the radio communication in box K8.

Figure 2:
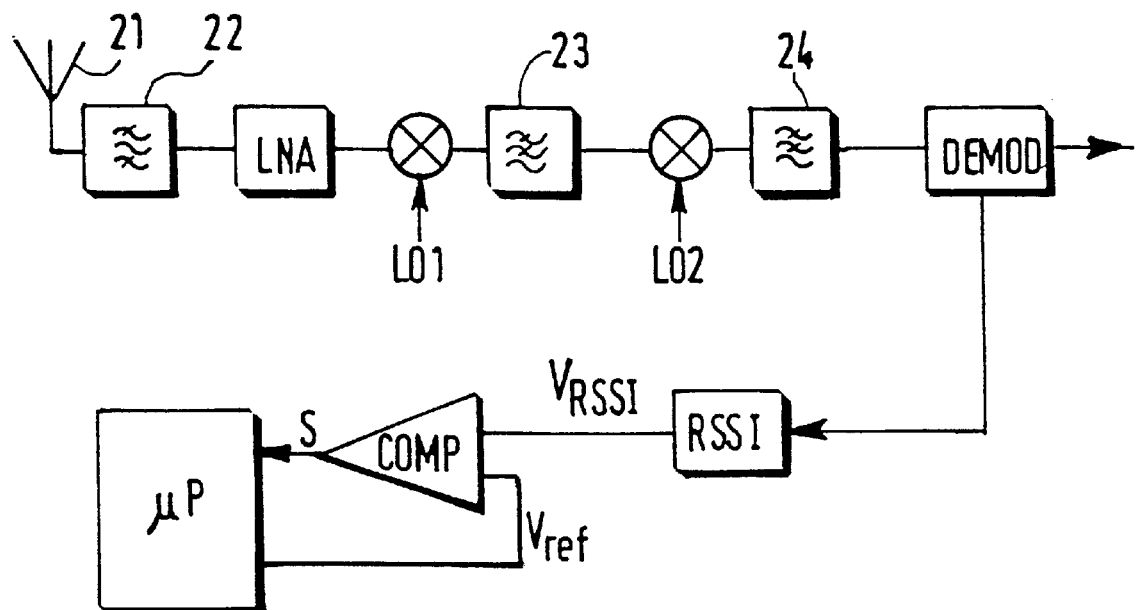
FIG. 2 is a basic circuit diagram of one of the parts of telecommunications equipment according to the invention for implementing the method of FIG. 1.

FIG. 2 shows in detail one of the parts of communications equipment according to the invention. This is, for example, the base station of a wireless telephone or the handset, their roles being symmetrical for the invention.

The block diagram is a diagram of a type of frequency-modulation radio receiver. It includes a transceiver antenna 21, a bandpass filter 22, a low-noise amplifier LNA, a first local oscillator LO1, a first low-pass filter 23, a second local oscillator LO2, a second low-pass filter 24, a demodulator DEMOD, an RSSI electric field detector, a programmable comparator COMP and a microprocessor μP.

One output of the demodulator DEMOD is connected to the audio circuit of the base station or of the handset and another output is connected to the RSSI field detector. The RSSI detector measures the received electric field and produces on the output a voltage $V_{RSSI}$ as a function of the measured field. The voltage $V_{RSSI}$ is then fed to the comparator COMP and compared to a reference voltage $V_{ref}$ programmed by the microprocessor μP. The result of the comparison S is a binary data that indicates whether the channel is free (for example S=0) or occupied (for example S=1). This result is communicated to the processor to be processed there.

Software loaded into the processor permanently analyzes the information on the output S of the comparator. In this example, S=1 indicates that the base station or the handset detects the presence of the other part and S=0 is the range-limit signal that indicates that the base station or the handset does not detect the presence of the other part.

The processor also includes:
an internal clock associated to delay means for triggering a delay when the range-limit signal S=0 is detected,
transmitting means for sending a request message for presence confirmation to the other part via the antenna 21, at the expiration of the delay,
receiving means for receiving and processing the presence confirmation message, and
means for cutting off the communication between the two parts if said presence confirmation message has not been received before the expiration of the delay.

Figure 3:
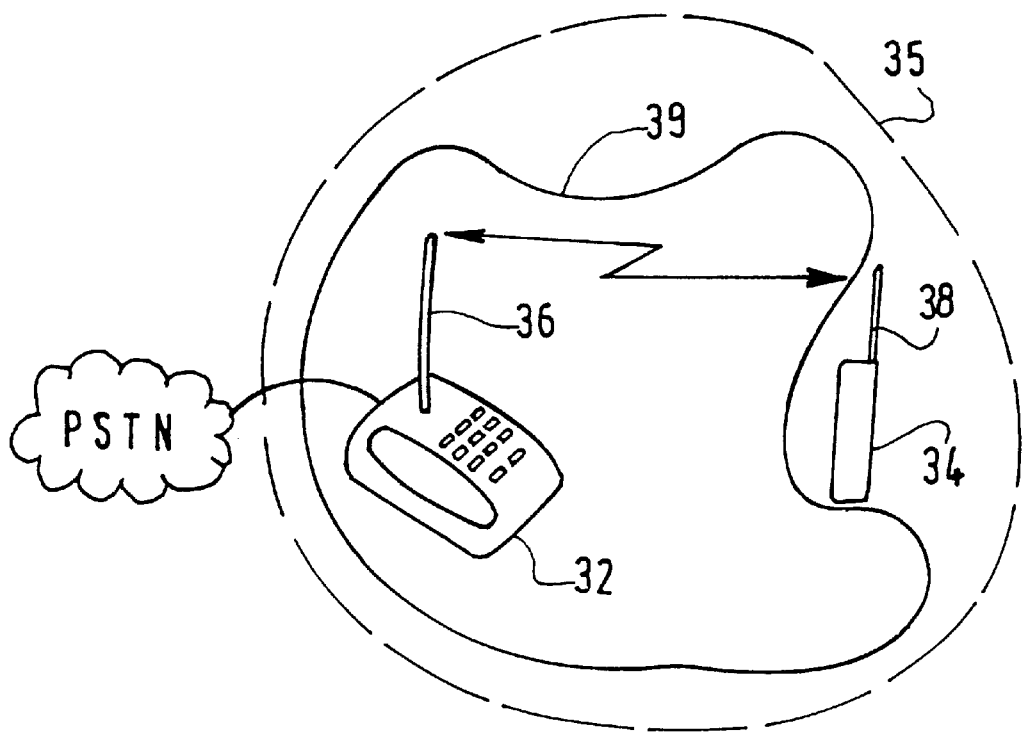
FIG. 3 represents telephony equipment according to the invention.

FIG. 3 represents an example of wireless telephony equipment according to the invention. It is formed by a base station 32 connected to the public switched network PSTN and by a wireless handset 34 which may communicate by radio channel inside the radio coverage area 35 by means of transceiver antennas 36 and 38.

During the radio communication, the base station verifies the presence of the mobile inside a range-limit detection zone 39 by reading the RSSI field. In the open field, that is, when no obstacle (wall or working electrical apparatus) disturbs the electric field emitted by the mobile, the radio coverage area 35 is mixed up with the range-limit detection area 39. The ideal situation being rarely respected, it frequently happens that the mobile is outside the radio coverage area 39 according to the RSSI field, while it is inside the actual radio coverage area 35, as illustrated in FIG. 3. In this situation, the communication could be cut off, as required by certain standards and notably the analog standards CT0 and CT1. To remedy this drawback, the base station thus triggers the presence verification protocol represented in FIG. 1 to avoid the communication being cut off as long as the radio quality is sufficient.

It will be obvious that the examples described and shown are not restrictive and that there are numerous variants of embodiment of the invention, which variants of embodiment may be deduced from the present description without leaving the scope of the invention.

What is claimed is:

1. A range-limit verification method in a wireless telecommunications system comprising at least two parts communicating by radio channel inside a coverage area, the method comprising:
    a. reading an electric field level received by the second part and transmitted by the first part
    b. generating a range-limit signal when an electric field level received by the second part falls below a predetermined detection threshold;
    c. triggering a presence verification step in response to said range-limit signal for verifying presence of said first part inside the coverage area, said presence verification comprising:
        i. enabling said second part to transmit a request message requesting confirmation of presence of said first part; and
        ii. enabling said first part to respond to said request message by transmitting a presence-confirmation signal for receipt by said second part for verifying said presence,
    wherein said communicating by radio channel is uninterrupted when said parts are maintained in an off-hook condition while one of said parts is moved from a range-limit detection are to a periphery of said coverage area thereby increasing a range of use.

2. A method as claimed in claim 1, said presence verification step comprises:
    repeating said presence verification step as long as said presence-confirmation signal is received by said second part in a defined time period; and,
    terminating said communicating between said first part and said second part when said presence-confirmation signal has not been detected by said second part in a defined time period.

3. A method as claimed in claim 2, wherein said repeating step is stopped when, during said reading step, a received electric field level is detected that exceeds a predetermined detection threshold.

4. Telecommunications equipment comprising:

at least a first and a second part which may communicate by radio channel inside a coverage area, means for detecting an electric field level received by the second part and transmitted by the first part for detecting a range-limit signal, presence verification means for verifying the presence of the first part inside said area, said presence verification means being triggered as a result of the detection of said range-limit signal and including transmitting means for transmitting a radio message requesting a confirmation of presence to said first part.

5. Telecommunications equipment as claimed in claim 4, wherein said transmitting means sends said message requesting said confirmation of presence to said first part at given time intervals, and wherein the presence verification means further include:

delay means for triggering a delay that corresponds to said time intervals, receiving means for receiving said presence confirmation message, means for cutting off radio communications, triggered if said presence confirmation message is not received by said second part in a given period of time.

6. Telecommunications equipment as claimed in claim 4, characterized in that it is in conformity with an analog standard of the type CTO.

7. A base station formed by said second part of wireless telephony equipment as claimed in claim 4, said first part being formed by a mobile handset, characterized in that it comprises said means for detecting a received electric field level for measuring the electric field level emitted by the handset, said presence verification means for verifying the presence of the handset inside said radio coverage area.

8. A mobile handset formed by said second part of wireless telephony equipment as claimed in claim 4, said first part being formed by a base station, characterized in that it comprises:

said means for detecting a received electric field level for measuring the electric field level emitted by the base station, said presence verification means for verifying the presence of the base station inside said radio coverage area.

9. Telecommunications equipment as claimed in claim 4, wherein said presence verification means are deactivated when a received electric field level is detected that exceeds a predetermined threshold.

10. A wireless telecommunication network comprising:

a first unit; and a second unit in communication with said first unit wirelessly;

said first unit transmitting a first signal to said second unit;

said first and second units repeating a presence confirmation protocol comprising:

said second unit transmitting a request message requesting confirmation of presence of said first unit in response to detection of said first signal if said first signal is below a predetermined detection threshold;

said first unit transmitting a presence-confirmation signal in response to said request message;

said first and second units terminating said communication between them when said presence-confirmation signal has not been detected by said second unit in a defined time period; and, stopping said repeating if said first signal exceeds said predetermined detection threshold.

* * * * *